United States Patent
Li

(10) Patent No.: US 7,047,307 B2
(45) Date of Patent: May 16, 2006

(54) METHOD AND APPARATUS FOR BROADCASTING MEDIA OBJECTS WITH GUARANTEED QUALITY OF SERVICE

(75) Inventor: Fulu Li, Nepean (CA)

(73) Assignee: Nortel Networks Limited, (CA)

( * ) Notice: Subject to any disclaimer, the term of this patent is extended or adjusted under 35 U.S.C. 154(b) by 0 days.

(21) Appl. No.: 10/939,023

(22) Filed: Sep. 10, 2004

(65) Prior Publication Data
US 2005/0033856 A1 Feb. 10, 2005

Related U.S. Application Data

(63) Continuation of application No. 09/693,191, filed on Oct. 20, 2000, now Pat. No. 6,801,947.

(60) Provisional application No. 60/222,253, filed on Aug. 1, 2000.

(51) Int. Cl.
*G06F 15/16* (2006.01)
(52) U.S. Cl. ........................................ 709/231; 725/87
(58) Field of Classification Search ........ 709/230–235, 709/217, 219; 725/87
See application file for complete search history.

(56) References Cited

U.S. PATENT DOCUMENTS

| | | | | |
|---|---|---|---|---|
| 5,583,995 A | * | 12/1996 | Gardner et al. | 709/219 |
| 5,831,662 A | * | 11/1998 | Payton | 725/122 |
| 5,926,205 A | * | 7/1999 | Krause et al. | 725/103 |
| 6,018,359 A | * | 1/2000 | Kermode et al. | 725/101 |
| 6,037,983 A | * | 3/2000 | Au et al. | 348/399.1 |
| 6,044,396 A | * | 3/2000 | Adams | 725/95 |
| 6,055,560 A | * | 4/2000 | Mills et al. | 709/200 |
| 6,269,394 B1 | * | 7/2001 | Kenner et al. | 709/217 |
| 6,510,553 B1 | * | 1/2003 | Hazra | 725/87 |
| 6,625,656 B1 | * | 9/2003 | Goldhor et al. | 709/231 |
| 6,868,452 B1 | * | 3/2005 | Eager et al. | 709/231 |
| 6,880,018 B1 | * | 4/2005 | Kajiki et al. | 709/233 |
| 2002/0107968 A1 | * | 8/2002 | Horn et al. | 709/230 |

\* cited by examiner

*Primary Examiner*—Abdullahi Salad
(74) *Attorney, Agent, or Firm*—McGuinness & Manaras LLP

(57) ABSTRACT

A method and apparatus for broadcasting media objects for such bandwidth-intensive applications as Media on Demand (MoD) or Video on Demand (VoD) employ a novel Stair-Case Broadcast (SCB) scheme. A media server in accordance with one example of the invention includes a fragmenter that fragments media objects into multiple segments, with each segment provided to a corresponding streamer. Each streamer periodically and continuously streams data associated with its corresponding media segment on a connection between the server and a media client. A download controller in the media client selectively causes the proper streams to be received for downloading from the server in accordance with the fragmentation of the selected media object and the number of streams that the client can simultaneously receive for downloading. A selector is operable to cause data from each successive segment to be downloaded from the corresponding stream immediately regardless of the position in the period associated with the successive segment. By its design, the method and apparatus of the present invention allow for lossless broadcast of media contents with de-coupled per-media-object server and client bandwidth design considerations.

24 Claims, 4 Drawing Sheets

METHOD AND APPARATUS FOR BROADCASTING MEDIA OBJECTS WITH GUARANTEED QUALITY OF SERVICE

CROSS-REFERENCE TO RELATED APPLICATIONS

The present application is a continuation of U.S. patent application Ser. No. 09/693,191, filed Oct. 20, 2000, now U.S. Pat. No. 6,801,947, based on, and claims priority from, U.S. Provisional Application No. 60/222,253, filed Aug. 1, 2000 and entitled "A Lossless Staircase Broadcast Scheme for Multimedia Contents Delivery," commonly owned by the present assignee, the contents of which are incorporated herein by reference.

FIELD OF THE INVENTION

This invention relates generally to streaming media objects and, more particularly, to broadcast schemes for streaming media objects on demand from a server to a client over a digital network.

BACKGROUND OF THE INVENTION

Media-on-Demand (MoD), and in particular Video-on-Demand (VoD), is becoming a popular digital network application. One highly scalable scheme known for facilitating MoD and VoD, and reducing the cost of MoD and VoD especially for popular media objects, is called periodic broadcast. In this scheme, media objects are broadcast periodically, and multiple users are served via one single transmission, thus substantially reducing the bandwidth requirements for the most frequently requested media objects. Most current periodic broadcast schemes assume Constant-Bit-Rate (CBR) encoded media objects rather than Variable-Bit-Rate (VBR) encoded media objects. This is despite the fact that, for the same video and the same desired image quality, CBR encoding requires twice or more bandwidth than that required for VBR encoding. However, the few existing proposals that support the bandwidth-efficient family of VBR encoded media objects suffer from data loss because they allow the aggregate traffic of the simultaneously-transmitted segments of the media contents to exceed the broadcast link capacity. Accordingly, there are no existing schemes that can provide lossless delivery of media content while guaranteeing a minimum latency and quality of service, while also allowing bandwidth requirements on both the sending and receiving ends to be easily designed.

SUMMARY OF THE INVENTION

The present invention relates to a method and apparatus for broadcasting media objects for such bandwidth-intensive applications as Media on Demand (MoD) or Video on Demand (VoD) in accordance with a novel StairCase Broadcast (SCB) scheme. A media server in accordance with one example of the invention includes a fragmenter that fragments media objects into multiple segments, with each segment provided to a corresponding streamer. Each streamer periodically and continuously streams data associated with its corresponding media segment on a connection between the server and a media client. A download controller in the media client selectively causes the proper streams to be received for downloading from the server in accordance with the fragmentation of the selected media object and the number of streams that the client can simultaneously receive for downloading. A selector is operable to cause data from each successive segment to be downloaded from the corresponding stream immediately regardless of the position in the period associated with the successive segment. By its design, the method and apparatus of the present invention allow for lossless broadcast of media contents with decoupled per-media-object server and client bandwidth design considerations.

In accordance with one aspect of the invention, a method for providing a media object to a client from a server coupled to the client via a connection, the media object being fragmented into segments in accordance with a fragmentation sequence from a first segment to a last segment, each segment comprising a respective number of frames of media content in a respective succession from a first frame to a last frame, comprises the steps of causing the media content associated with each of the segments to be provided on a corresponding stream in accordance with the succession from the first frame to the last frame, providing a first number of the streams on the connection, the first number of the streams including the corresponding stream to the first segment, halting the provision of the corresponding stream to the first segment on the connection when the respective number of frames of the first segment have been provided on the corresponding stream, providing a next stream corresponding to a next segment in the fragmentation sequence on the connection after the halting step, and starting the step of providing the next stream at a point in the respective succession between the first frame and the last frame.

In accordance with a further aspect of the invention, an apparatus for providing a media object to a client from a server coupled to the client via a connection, the media object being fragmented into segments in accordance with a fragmentation sequence from a first segment to a last segment, each segment comprising a respective number of frames of media content in a respective succession from a first frame to a last frame, the apparatus comprises means for causing the media content associated with each of the segments to be provided on a corresponding stream in accordance with the succession from the first frame to the last frame, means for providing a first number of the streams on the connection, the first number of the streams including the corresponding stream to the first segment, means for halting the provision of the corresponding stream to the first segment on the connection when the respective number of frames of the first segment have been provided on the corresponding stream, means for providing a next stream corresponding to a next segment in the fragmentation sequence on the connection after the halting step, and means for starting the step of providing the next stream at a point in the respective succession between the first frame and the last frame.

In accordance with a further aspect of the invention, a method of fragmenting a media object into a fragmentation comprising a plurality $K_m$ of segments, the segments having a sequence from a first segment to a last segment, the media object having a plurality $N_m$ of frames of media data, the method comprises the steps of initializing the fragmentation to $K_m = N_m$ segments, each segment containing one frame, determining, for each of the $K_m$ segments, a corresponding bandwidth required to download the segment, combining two successive segments in the sequence into a new segment, and controlling the combining step so as to minimize a total variance between the corresponding bandwidth for each of the $K_m$ segments.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the implementation of certain elements of the present invention may be accomplished using software, hardware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration.

Figure 1:
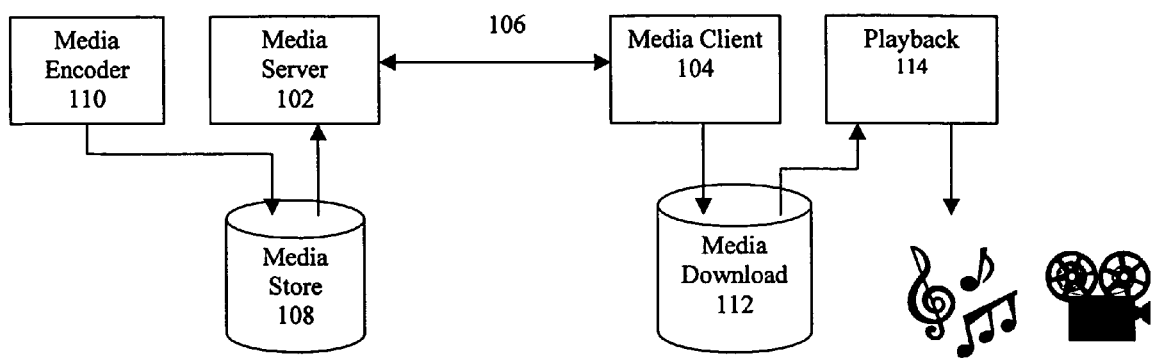
FIG. 1 illustrates an example topology of a server and client for streaming a media object in accordance with one embodiment of the present invention.

FIG. 1 illustrates an example topology in accordance with one embodiment of the present invention.

As shown in FIG. 1, a media server 102 communicates with a media client 104 over a connection 106. Communications from media server 102 can include media content from media store 108 that has been encoded by media encoder 110. The media content is downloaded from media server 102 to media client 104 and stored in download storage 112 so that it can be played back for perception by a user associated with media client 104 through a player 114.

Media content can include audio, video and combinations thereof. For example, the media content can be feature movies, TV news, talk shows, live sporting events, distance learning courses, home banking, commercial advertisements, e-commerce activities, etc.

Connection 106 can be, for example, a digital cable or satellite network. Although the present invention will be described in detail with reference to this example implementation, it should be noted that the invention can be extended to other types of networks such as LANs, WANs, MANs or the Internet, and combinations thereof. Further, connections can be wired or wireless, and may further include gateways between different types of connections.

Media encoder 110 implements standard encoding techniques. The media contents are often encoded before their transmission in order to reduce bandwidth and storage requirements. The broadcasting scheme of the present invention can be used in conjunction with various encoding schemes such as those provided by the Moving Pictures Expert Group (MPEG), H222.1, Joint Photographic Expert Group (JPEG), H.261, Multimedia & Hypermedia Information Coding Experts Group (MHEG), Digital Storage Media Command & Control (DSM CC), Digital Audio Visual Council (DAVIC), H.323, etc. The encoded media content (e.g. an MPEG file) from media encoder 110 is provided to media store 108, which can be implemented by any type of permanent or temporary recordable medium. In one example of the invention, Variable Bit Rate (VBR) encoding of media objects is used, wherein each frame of the encoded media object may contain a variable number of bits. However, the invention is not necessarily limited to this example, and Constant Bit Rate (CBR) encoded media objects may also be used.

Generally, media server 102 is responsible for broadcasting media content on connection 106 and media client 104 is responsible for controlling the reception and downloading of the broadcasted media content from media server 102 and for providing the downloaded content to media download store 112 in substantially the same format as the content existed in media store 108 (e.g. an MPEG file).

Player 114 is capable of recognizing and understanding the encoding used on the media content by media encoder 110 and for decoding the downloaded media data in accordance with the encoding used. For example, where the media content has been encoded by media encoder 110 using MPEG techniques, player 114 includes a MPEG decoder. Although shown separately, player 114, media client 104 and download storage 112 may be combined together in various ways or in one device. In one example of the invention, media client 104, download storage 112 and player 114 are comprised together of hardware and software in a set-top box.

It should be noted that server 102 preferably includes the ability to communicate simultaneously with many clients 104 over different connections 106, although only one client and associated connection is shown in FIG. 1.

Figure 2:
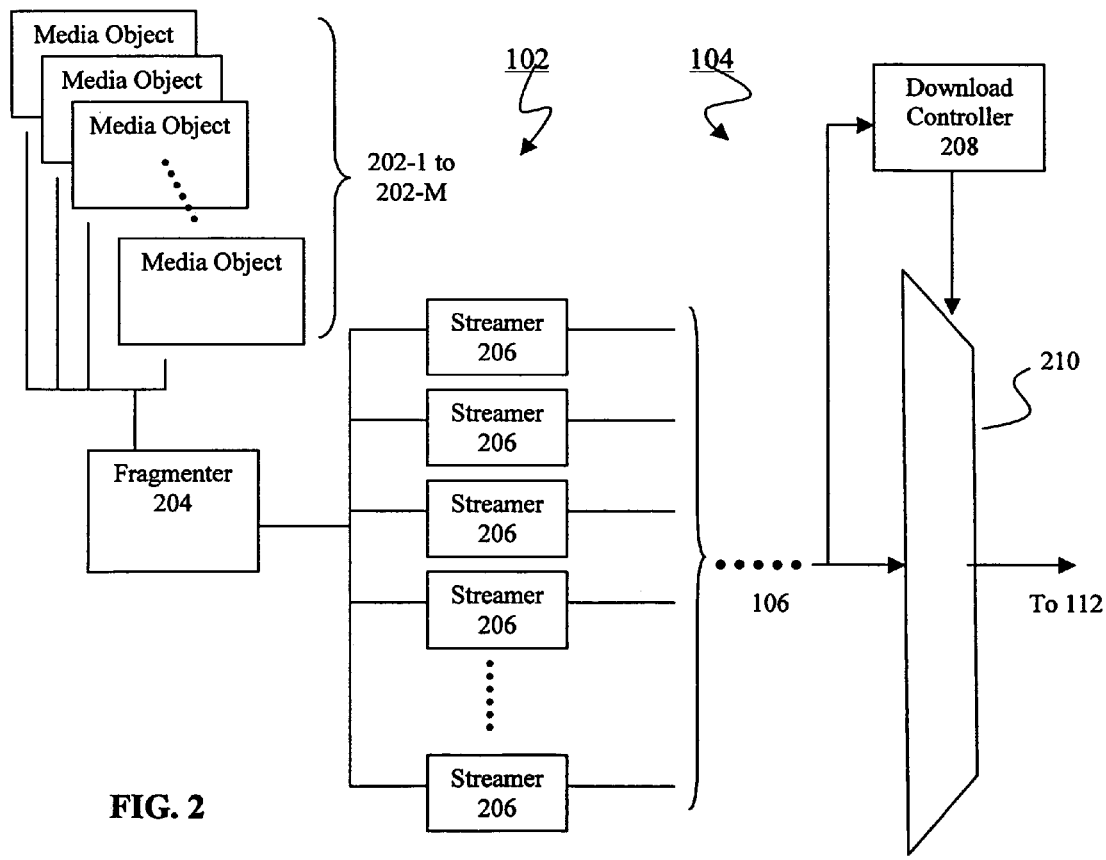
FIG. 2 is a structural block diagram of an example media server and media client in accordance with one embodiment of the present invention.

FIG. 2 illustrates in more detail an example media server 102 and media client 104 in accordance with one embodiment of the present invention.

As shown in FIG. 2, media server 102 includes a fragmenter 204 and streamers 206, and client 104 includes a download controller 208 and selector 210.

Generally, in operation, media server 102 accesses media objects 202-1 to 202-M from media store 108. Each of these media objects is broken up into segments by fragmenter 204, and each of the segments is provided to a respective streamer 206. Each segment is continually and periodically broadcast on connection 106. Download controller 208 listens on the connection 106 for streams containing the desired media object and causes selector 210 to download the streams from the connection 106 into media download store 112. In one example of the invention, client 104 includes the ability to download several streams simultaneously from the server 102. Selector 210 thus enables this number of streams to be simultaneously stored in download store 112.

It should be noted that media server 102 preferably includes the ability to communicate simultaneously with many clients, but an example of communicating with only one client 104 is shown in FIG. 2 for ease of illustration. It should be further noted that server 102 and client 104 can include many other components for facilitating the broadcast and downloading of data on connection 106. The selection and structure of such additional components may depend on the type of connection (e.g. digital cable or Internet, wired or wireless) as will be understood by those skilled in the art. Accordingly, even further detailed descriptions of such additional components is not necessary for an understanding of the present invention.

In one example of the invention, media server 102 uses a periodic broadcast scheme for downloading the segments of each media object. In this example, after fragmenter 204 partitions each entire media object 202 into smaller successive and non-overlapping segments, each segment is continuously and periodically broadcast on a separate stream by a respective one of the streamers 206 at a certain bit rate (i.e. bandwidth). The streamers can be implemented in various straightforward ways familiar to those skilled in the art using conventional buffers and network interfaces, and so even further detailed discussion thereof is not necessary for the present invention. The media server 102 simply follows the broadcast scheme of the present invention to transmit media segment in a separate stream channel at the specified bit rate periodically and continuously.

When a client wants to download a media object from the server, download controller 208 listens for the streams that correspond to the desired object and causes selector 210 to collect data from the corresponding streams in the proper sequence (and for the proper duration so as to provide all the content for the associated segment) on the connection from the server.

Consider a server 102 having access to a plurality of media objects 202-1 to 202-M. Fragmenter 204 thus divides the $m^{th}$ media object ($1 \leq m \leq M$) into $K_m$ segments, which may each have a different size corresponding to the number of frames in the segment and the number of bits in each frame. Fragmenter 204 provides each segment to a respective one of streamers 206 for broadcasting over connection 106. Let $S_m^i$ denote the set of successive frames in the $i^{th}$ segment of the $m^{th}$ media object. The server thus broadcasts, as a whole, $$\sum_{m=1}^{M} K_m$$

media streams simultaneously, with each streamer 206 simultaneously and periodically broadcasting the same segment $S_m^i$ of the same $m^{th}$ media object. Let $|S_m^i|$ denote the number of frames in the segment $S_m^i$. The total number of frames $N_m$ in the $m^{th}$ media object is thus given by:

$$N_m = \sum_{i=1}^{K_m} |S_m^i| \qquad \text{(Eq. 1)}$$

In one example of the media server 102 of the present invention, each of the $K_m$ segments for the $m^{th}$ media object is continuously and periodically transmitted by a separate streamer 206 at a corresponding bandwidth of $b_m^i$ ($i=1, \ldots, K_m$). Let $B_m(S_m)$ denote the total required server bandwidth to transmit the $m^{th}$ media object for a given transmission schedule (i.e. fragmentation) $S_m$. Thus, the total bandwidth necessary to transmit the $m^{th}$ media object for the media server given a fragmentation $S_m=\{S_m^1, \ldots, S_m^{K_m}\}$ is:

$$B_m(S_m) = \sum_{i=1}^{K_m} b_m^i(S_m) \qquad \text{(Eq. 2)}$$

Let $U_m$ ($1 \leq U_m \leq K_m$) stand for the number of streams that the client can download simultaneously for the $m^{th}$ media object. The client downloads media data from the $U_m$ streams as long as there are more segments to be downloaded from subsequent streams of the $m^{th}$ media object. Moreover, the download of each of the first $U_m$ segments starts at the same time. Let $B_{c,m}(S_m)$ denote the required client bandwidth to download the $m^{th}$ media object for a given fragmentation or transmission schedule $S_m$. Thus, the total bandwidth necessary to download all of the segments of the $m^{th}$ media object for the client given a fragmentation $S_m=\{S_m^1, \ldots, S_m^{K_m}\}$ is:

$$B_{c,m}(S_m) = \max_{1 \leq i \leq K_m - U_m + 1} \sum_{j=1}^{i+U_m-1} b_m^j \qquad \text{(Eq. 3)}$$

It should be apparent from the above Eqs. 2 and 3 that the required per-media object server and client bandwidth are de-coupled. That is, they can be separately designed and manipulated for separate server bandwidth constraints and client bandwidth constraints, although they will be somewhat related given that they are both determined from the per-segment streaming bandwidths of the media object. However, whereas the maximum server bandwidth can be designed to be a constant aggregate bandwidth, the maximum client bandwidth can be designed as simply the maximum of any aggregate of simultaneous streams downloaded by the client.

The operation of the broadcast scheme of the present invention will now be described in more detail with reference to FIG. 3.

Figure 3:
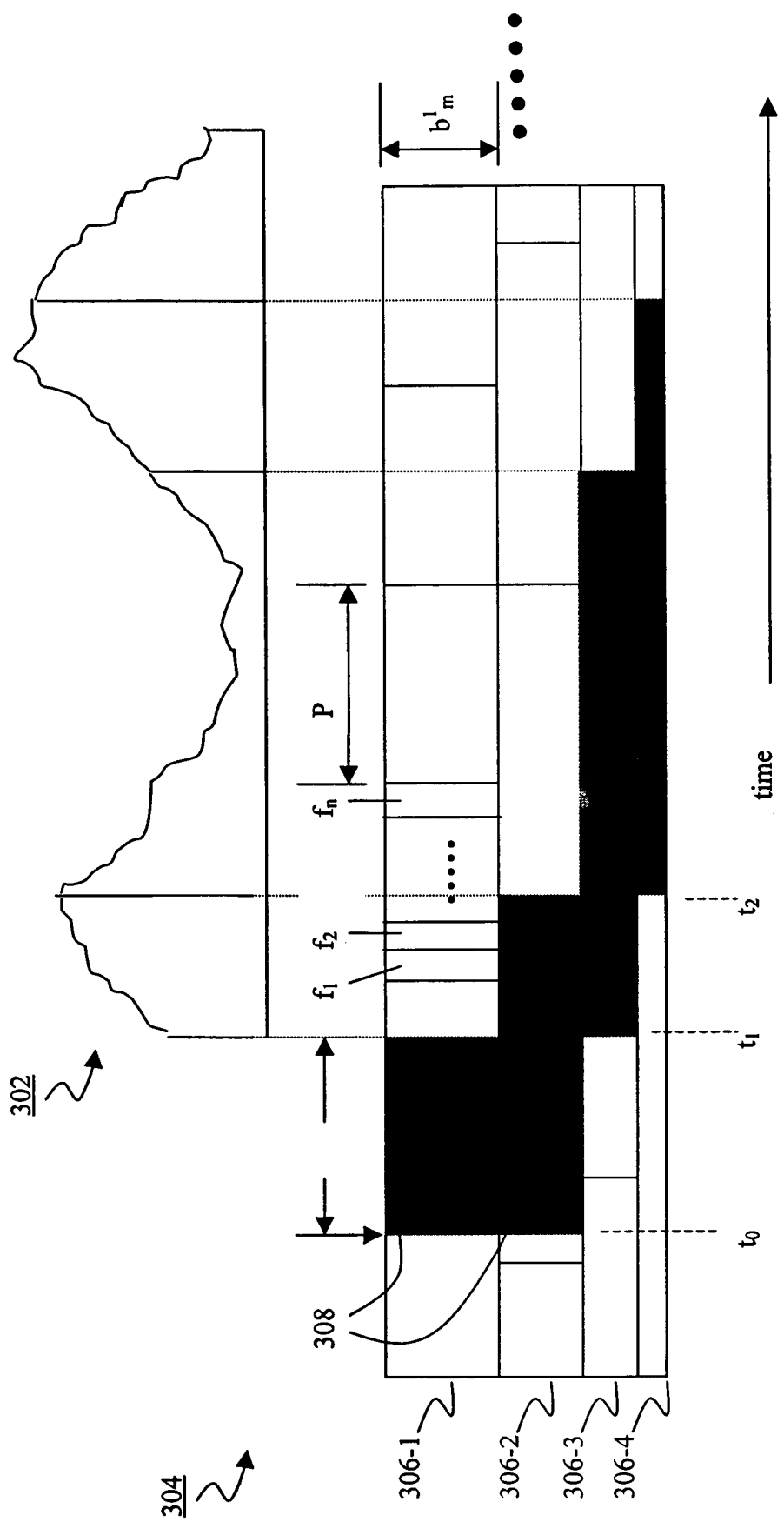
FIG. 3 is a graph illustrating an example implementation of a StairCase Broadcast (SCB) scheme in accordance with one embodiment of the present invention.

In FIG. 3, graph 302 represents the playback of the $m^{th}$ media object at the client and graph 304 represents the download of the media object m from the continuous and concurrent periodic broadcast of four example segments $S_m^i$ (i=1 to 4) of the media object. The maximum number of streams that the client can download simultaneously, i.e., $U_m$, is 2 in this example. Graph 304 shows that each of the four segments is periodically and continuously transmitted on a separate stream 306 at bandwidth $b_m^i$. That is, each streamer 206 corresponding to streams 306 broadcasts one of the four segments $S_m^i$ (i=1 to 4) from beginning to end, then re-broadcasts the same segment from beginning to end again, with the process continuing throughout an operation period of the media server 102.

For example, as shown in FIG. 3, stream 306-1 contains data from segment $S_m^1$, comprising $|S_m^i|$ frames in a sequence from a first frame $f_1$ to a last frame $f_n$. The succession of frames in segment $S_m^1$ is streamed from beginning to end at a bandwidth of $b_m^1$, and then streamed from beginning to end again at the same bandwidth, with the beginning of the sequence being re-started periodically with a period P. It should be noted that, in this example, the period P is the same as the time required to stream the $|S_m^i|$ frames of segment $S_m^1$. However, the invention is not limited to this example. It should be further noted that, although not shown, the data broadcast in each stream may contain some tag information that identifies the media object corresponding to the stream, the segment in the fragmentation sequence, the number of frames in the segment and (if the tags are provided in each frame) the frame number in the segment.

The shaded areas 308 in the download graph 304 correspond to the information that is actually downloaded by the client 104 from each of the streams 306 via selector 210. Once the entire information in the i-th segment $S_m^i$ is downloaded to the client, downloading of the $(i+U_m)$-th segment will immediately commence, as long as $(i+U_m) \leq K_m$ for the selected media object m. According to the broadcast schedules of the present invention, the i-th segment should not be fully downloaded before the (i−1)-th segment, so as to minimize the required bandwidth for each segment. As can be seen, in this example of the invention, the client starts downloading when it can, and need not wait for the time corresponding to when the beginning frame in the respective segment is being broadcast.

More particularly, as shown in the example of FIG. 3, at time $t_0$ (preferably corresponding to a time when the client first makes a request for media object 202-m), the first $U_m=2$ segments begin downloading to the client via streams 306-1 and 306-2. Note that it is not necessary that $t_0$ correspond to a time when streams 306-1 and 306-2 contain the first frame $f_1$ of the corresponding first and second segments. However, downloading via streams 306-1 and 306-2 continues until all $|S_m^i|$ of the frames in the sequence are downloaded. Accordingly, as shown in FIG. 3, at time $t_1$, all the frames in the segment $S_m^i$ corresponding to stream 306-1 have been downloaded, at which point the next successive segment begins downloading via stream 306-3. Again, it should be noted that time $t_1$ need not correspond to a time when stream 306-3 contains the first frame $f_1$ of the corresponding third segment.

On the client side, as shown in graph 302, each segment $S_m^i$ can be immediately played back after it is completely stored at the client. This scheme is called StairCase Broadcast (SCB) because the shaded areas in the download graph 304 of FIG. 3 (the data actually downloaded at the client from the broadcasted sequence of segments) look like a downward staircase as time progresses. Accordingly, as shown in FIG. 3, at time $t_1$, segment $S_m^i$ begins being played back at the client immediately after downloading that segment has completed. Likewise, at time $t_2$, segment $S_m^2$ begins being played back at the client immediately after downloading that segment has completed.

Following the example of the invention illustrated in FIG. 3, and to guarantee the service latency $w_m$ for the $m^{th}$ video, it can be seen that the first segment must be broadcast at a bandwidth given by:

$$b_m^1(S_m) = \frac{\sum_{i \in S_m^1} f_m^i}{w_m} \quad \text{(Eq. 4)}$$

where $f_m^i$ denotes the number of bits in the i-th frame of the media object m.

More generally, to insure continuous and timely playback of the entire media object 202-m by the client 104, the segment, $S_m^i$, should be fully downloaded and available at the client just before the end of the playback of the previous segment in the media object $S_m^{i-1}$. Thus, the bandwidth at which the streamer 206 corresponding to the $i^{th}$ stream of the $m^{th}$ video must broadcast segment $S_m^i$ is determined by:

$$b_m^i(S_m) = \begin{cases} \dfrac{\sum_{j \in S_m^i} f_m^j}{w_m + \dfrac{\sum_{j=1}^{i-1} |S_m^j|}{F}}, & 1 \leq i \leq U_m \\[2ex] \dfrac{\sum_{j \in S_m^i} f_m^j}{\dfrac{\sum_{j=i-U_m}^{i-1} |S_m^j|}{F}}, & U_m < i \leq K_m \end{cases} \quad \text{(Eq. 5)}$$

Overall, after the service latency of $w_m$ seconds, uninterrupted playback of the media object 202-m is possible as long as the above bandwidth constraints are satisfied so as to allow each segment $S_m^i$ to be downloaded and available on local storage at the client just in time for its playback. The media object can thus be played back at its nominal frame rate of F frames per second in the order of $S_m^1 \cdot S_m^2 \cdot S_m^3 \ldots S_m^{K_m}$. Note that in this example of the invention where VBR encoded media objects are used (wherein the frames can have different sizes), the playback curve 302 of FIG. 3, which represents the per-frame consumed data, is also variable.

It should be further noted that the loss-less nature of SCB is evident since the aggregation of the bandwidth required for all the $K_m$ segments of $m^{th}$ media object is constant as described by Eqs. (2) and (5), given a desired service latency and fragmentation sequence. Moreover, Eqs. (2) through (5) show that a fragmentation sequence $S_m$ for the $m^{th}$ media object can be designed for a desired maximum client bandwidth $B_{c,m}(S_m)$, maximum server bandwidth $B_m(S_m)$ and service latency $w_m$.

Figure 4:
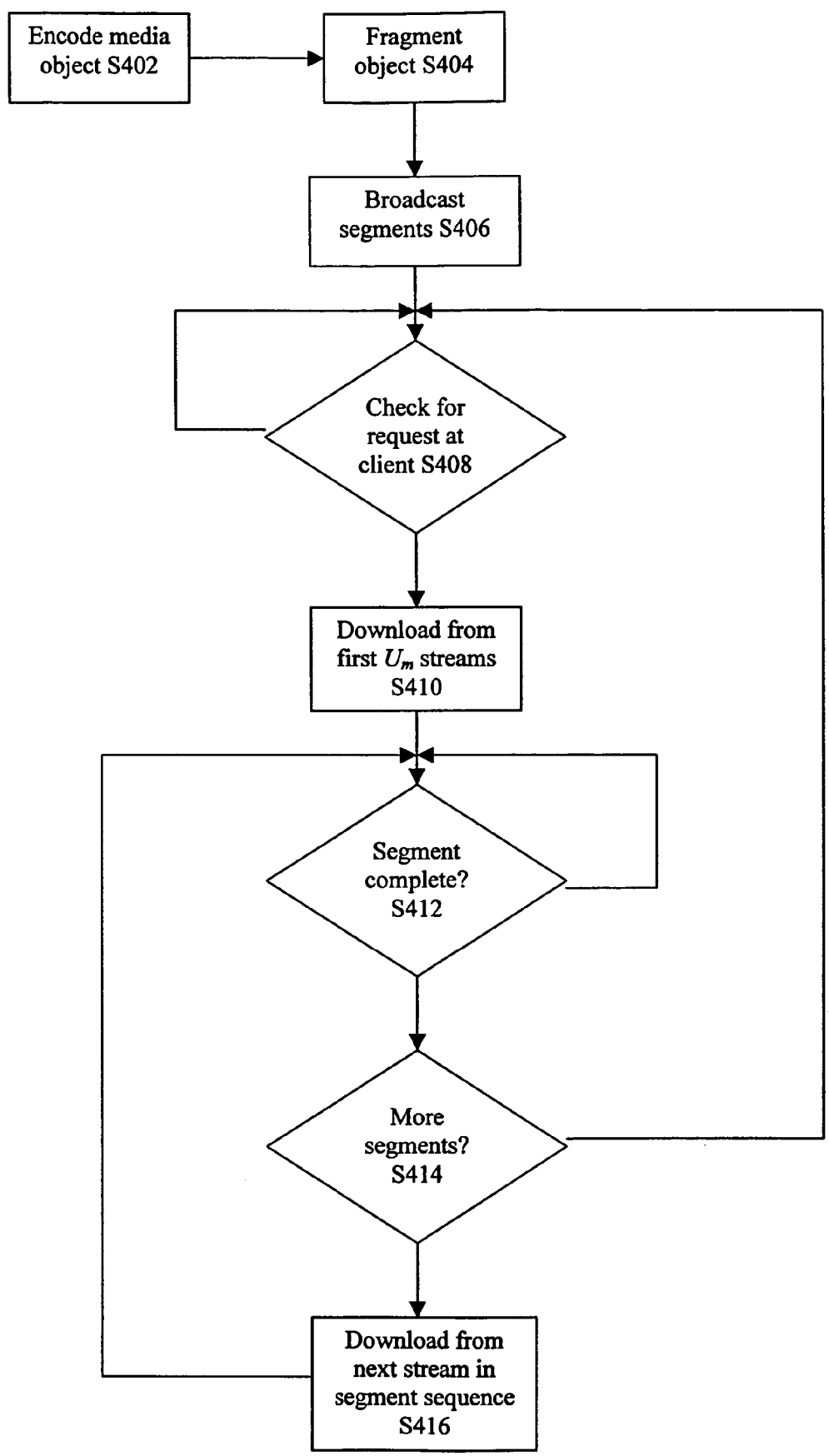
FIG. 4 is a flowchart illustrating an example method of streaming a media object from a server to a client in accordance with one embodiment of the present invention.

An example method of broadcasting a media object in accordance with one embodiment of the present invention is illustrated in the flowchart of FIG. 4. It should be apparent that the invention is not limited to broadcasting a single media object; however a method of broadcasting only one media object is described for ease of illustrating the invention.

As shown in FIG. 4, the media object is encoded in block S402. In block S404, the media object is fragmented into segments. In block S406, each segment is broadcast, continuously and periodically, on a separate stream. In block S408, it is determined whether a request for the media object has been made by a user or requesting process associated with the media client. If so, processing advances to block S410, where the first $U_m$ streams corresponding to the first segments of the media object are selected for downloading by the client simultaneously. It should be noted that downloading of data from streams is preferably begun immediately after the request is received rather than waiting for a point in time where the beginning frame of the segments is being streamed. Downloading of the $U_m$ segments continues until data corresponding to an entire segment has been streamed toward the client. For each of the $U_m$ segments being downloaded, in block S412 it is determined whether all data corresponding to the segment has been downloaded. If so, processing advances to block S414, where it is further determined if there are any remaining segments to be downloaded by the client. If so, the stream corresponding to the next segment in the fragmentation sequence is immediately selected for downloading by the client (block S414). Otherwise, processing returns to block S406 until a new client request for the media object is received.

An example method of fragmenting a media object in accordance with an embodiment of the present invention, as can be performed in block S404 in FIG. 4, will now be described.

As set forth above, the SCB scheme of the present invention facilitates design, by appropriate fragmentation of a media object, a maximum server bandwidth and a maximum client bandwidth for a desired service latency. Given the separate bandwidth equations for the server (Eq. 2) and the client (Eq. 3), however, it should be noted that an optimal solution for the server bandwidth is not necessarily optimal for the client bandwidth. Furthermore, given the variety of schedules $S_m = \{S_m^1, \ldots, S_m^{K_m}\}$ that can result from different fragmentations of each media object m, the server bandwidth minimization can become quite complicated.

As seen from Eq. 2, to achieve the minimal required server bandwidth, a fragmentation of the frame sequence with $K_m$ segments should be determined such that the sum of the necessary bandwidth to broadcast each segment can be minimized. On the other hand, from Eq. 3, to minimize the client bandwidth, a fragmentation of the frame sequence with $K_m$ segments should be determined such that the maximum of the sum of the necessary bandwidth to broadcast any $U_m$ consecutive segments can be minimized. It is observed that the closer the necessary bandwidth for each segment is to all other segments in a given fragmentation, the lower the sum will be for any $U_m$ consecutive segments and the lower the total necessary bandwidth will be for all the segments. Therefore, the optimal solution can be approximated by picking the fragmentation with the closest necessary bandwidth to broadcast each segment.

Figure 5:
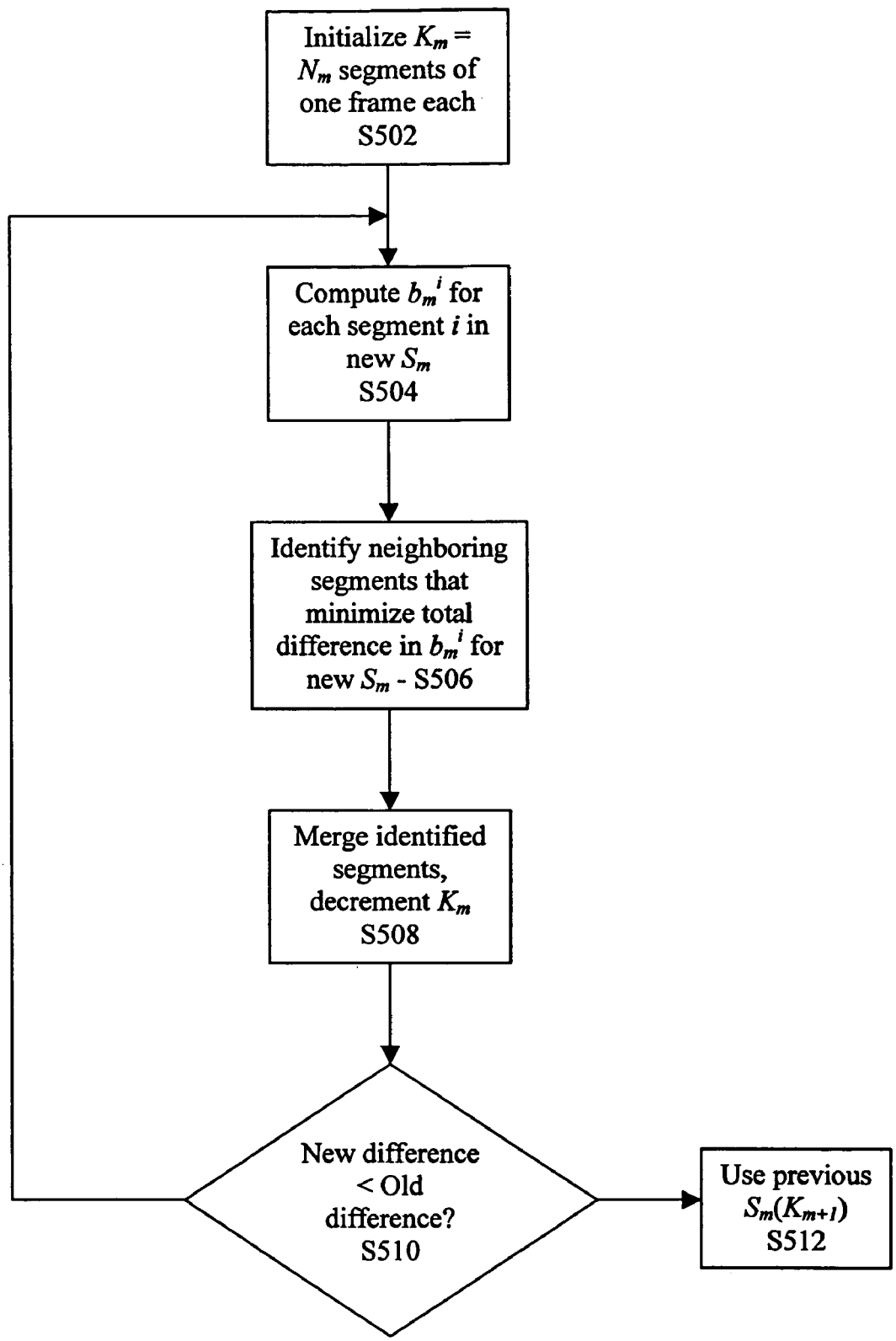
FIG. 5 is a flowchart illustrating an example method of optimizing server and client bandwidth for streaming a media object in accordance with one embodiment of the present invention.

FIG. 5 is a flowchart for illustrating a near-optimal solution for minimizing both server and client bandwidth in accordance with one embodiment of the present invention. As can be seen, it is very simple and intuitively appealing. First, in block S502, the fragmentation $S_m$ is initialized to $N_m$ segments (i.e. $K_m = N_m$), each segment thus consisting of one and only one frame. Next, in block S504, the necessary bandwidth for each segment, $b_m^i(S_m)$, is computed according to Eq. 5. In block S506, the two neighboring segments that will cause the total difference $\Delta(S_m(K_m))$ between the necessary bandwidth among all of the current segments ($\Sigma|(b_m^{(i+1)} - b_m^i)|(i=1 \ldots K_m-1))$ to be minimized are identified. These two segments are then merged into one segment (block S508) and $K_m$ is decremented. Next, it is determined whether the new total difference is less than the previous total difference $\Delta(S_m(K_{m+1}))$ (block S510). If not, use the fragmentation $S_m(K_{m+1})$ that resulted from the previous iteration (block S512). Otherwise, processing returns to block S504 until the total difference cannot be minimized any further (as determined from block S510). The running time for this algorithm is on the order of $O(N_m^2)$ and the space requirement is on the order of $O(N_m)$.

It should be noted that the novel broadcast scheme according to the present invention, called StairCase Broadcast (SCB), supports, by its design, both the lossless periodic broadcast of VBR encoded media contents and de-coupled per-media-object server and client bandwidth constraints. Moreover, the particular structure and distribution setup for media content according to the invention does not require the start of downloading each segment to be coincident with the time when the beginning frame of the segment is being broadcast. Further, once the first segment of the selected media object is fully downloaded, the present invention allows for the continuous playback of the media content at the client to be guaranteed.

It should be further noted that the SCB scheme of the present invention significantly differs from the smoothing related techniques such as the optimal smoothing scheme by Salehi et al., "Supporting Stored Video: Reducing Rate Variability and End-to-End Resource Requirements Through Optimal Smoothing," *IEEE/ACM Transactions on Networking*, 6(4):397–410, August 1998, in the sense that the optimal smoothing approach aims to reduce the rate variability for the transmission of stored VBR-encoded video given a limited client buffer capacity. Meanwhile, the SCB scheme of the present invention essentially forces each periodically-broadcasted media segment to be smoothed during each segment duration such that the loss-less nature of SCB can be guaranteed. In SCB, the segment duration is not determined by the client buffer capacity but by the timing requirement of broadcast schedules to guarantee the uninterrupted and continuous play-out of the video data for the client and the minimal required server and client bandwidth. Further, according to the broadcast schedule construction of SCB, no jitter is experienced by the customer since only when the whole media data of one segment is fully downloaded, the playback the this segment can begin. In the smoothing-related schemes of the prior art, smoothing of the media traffic results in the addition of jitter.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims include such changes and modifications.

What is claimed is:

1. A method for providing a media object to a client from a server coupled to the client via a connection, the media object being fragmented into segments in accordance with a fragmentation sequence from a first segment to a last segment, each segment comprising a respective number of frames of media content in a respective succession from a first frame to a last frame, the media content associated with each of the segments being provided on a corresponding stream in accordance with the succession from the fist frame to the last frame, the method comprising the steps of:

downloading media content at the client from a first number of the streams on the connection, the first number of the streams including the corresponding stream to the first segment;

halting the downloading of media content from the corresponding stream to the first segment on the connection when the respective number of frames of the first segment have been received on the corresponding stream; downloading media content at the client from a next stream corresponding to a next segment in the fragmentation sequence on the connection after the halting step;

starting the step of downloading from the next stream at a point in the respective succession between the first frame and the last frame, wherein the corresponding stream to the first segment has a first bandwidth, and the next stream corresponding to the next segment has a second bandwidth different than the first bandwidth; and constraining the first bandwidth so as to provide a desired service latency including the step of constraining the first bandwidth $b_m^1$ associated with the first segment $s^{n1}$ in accordance with a desired service latency $w_m$, such that $$b_m^1 = \frac{\sum_{i \in S_m^1} f_m^i}{w_m},$$

wherein denotes $f_m^i$ the number of bits in the i-th frame of the media object.

2. A method according to claim 1, wherein the media content associated with each of the segments is continuously and periodically provided on a corresponding stream in accordance with the succession from the first frame to the last frame.

3. A method according to claim 2, wherein each of the corresponding streams has an associated period.

4. A method according to claim 3, wherein the associated period is the time required to download the number of frames of the segment corresponding to the stream.

5. A method according to claim 1, further comprising the step of: constraining the second bandwidth in accordance with a time needed to playback all of the segments corresponding to the first number of streams at the client.

6. A method according to claim 1, wherein the first number of streams corresponds to the maximum number of streams that the client can process.

7. A method according to claim 1, further comprising the step of:
adjusting the respective number of frames comprising each segment so as to minimize a maximum server bandwidth and a maximum client bandwidth.

8. A method according to claim 1, further comprising the step of: encoding the media object.

9. A method according to claim 8, wherein the encoding step is performed in accordance with Variable Bit Rate (VBR) encoding.

10. A method for providing a media object to a client from a server coupled to the client via a connection, the media object being fragmented into segments in accordance with a fragmentation sequence from a first segment to a last segment, each segment comprising a respective number of frames of media content in a respective succession from a first frame to a last frame, the media content associated with each of the segments being provided on a corresponding stream in accordance with the succession from the first frame to the last frame, the method comprising steps of:
downloading media content at the client from a first number of the streams on the connection, the first number of the streams including the corresponding stream to the first segment;
halting the downloading of media content from the corresponding stream to the first segment on the connection when the respective number of frames of the first segment have been received on the corresponding stream; downloading media content at the client from a next stream corresponding to a next segment in the fragmentation sequence on the connection after the halting step;
constraining a total server bandwidth associated with the media object, wherein the number of segments in the fragmentation sequence is $K_m$, and wherein each of the corresponding streams has an associated bandwidth $b_m^i$, constraining step being performed so that the total server bandwidth $B_m$ satisfies the equation $$B_m = \sum_{i=1}^{K_m} b_m^j.$$

11. A method for providing a media object to a client from a server coupled to the client via a connection, the media object being fragmented into segments in accordance with a fragmentation sequence from a first segment to a last segment, each segment comprising a respective number of frames of media content in a respective succession from a first frame to a last frame, the media content associated with each of the segments being provided on a corresponding stream in accordance with the succession from the first frame to the last frame, the method comprising the steps of:
downloading media content at the client from a first number of the streams on the connection, the first number of the streams including the corresponding stream to the first segment;
halting the downloading of media content from the corresponding stream to the first segment on the connection when the respective number of frames of the first segment have been received on the corresponding stream; downloading media content at the client from a next stream corresponding to a next segment in the fragmentation sequence on the connection after the halting step;
starting the step of downloading from the next stream at a point in the respective succession between the first frame and the last frame;
constraining a maximum client bandwidth associated with the media object;
wherein the number of segments in the fragmentation sequence is $K_m$, and wherein each of the corresponding streams has an associated bandwidth $b_m^i$, and wherein the first number of streams is $U_m$, the constraining step being performed so that the total client bandwidth $B_{c,m}(S_m)$ satisfies the equation $$B_{c,m}(S_m)^m = \max_{1 \leq i \leq K_m - U_m + 1} \sum_{j=i}^{i+U_m-1} b_m^j.$$

12. A method according to claim 11, further comprising the step of:
adjusting the respective number of frames comprising each segment so as to minimize the total server bandwidth and the total client bandwidth.

13. An apparatus for providing a media object to a client from a server coupled to the client via a connection, the media object being fragmented into segments in accordance with a fragmentation sequence from a first segment to a last segment, each segment comprising a respective number of frames of media content in a respective succession from a first frame to a last frame, the media content associated with each of the segments being provided on a corresponding stream in accordance with the succession from the first frame to the last frame, the apparatus comprising:
means for downloading media content at the client from a first number of the streams on the connection, the first number of the streams including the corresponding stream to the first segment;
means for halting the downloading of media content from the corresponding stream to the first segment on the connection when the respective number of frames of the first segment have been received on the corresponding stream;

means for downloading media content at the client from a next stream corresponding to a next segment in the fragmentation sequence on the connection after an operation of the halting means;

means for starting operation of the means for downloading from the next stream at a point in the respective succession between the first frame and the last frame, wherein the corresponding stream to the first segment has a first bandwidth, and the next stream corresponding to the next segment has a second bandwidth different than the first bandwidth;

means for constraining the first bandwidth so as to provide a desired service latency, including means for constraining the first bandwidth $b^1_m$ associated with the first segment $S^1_m$ in accordance with a desired service latency $w_m$ such that $$b^1_m = \frac{\sum_{i \in S^1_m} f^i_m}{w_m}$$

wherein $f^1_m$ denotes the number of bits in the i-th frame of the media object.

14. An apparatus according to claim 13, wherein the media content associated with each of the segments is continuously and periodically provided on a corresponding stream in accordance with the succession from the first frame to the last frame.

15. An apparatus according to claim 14, wherein each of the corresponding streams has an associated period.

16. An apparatus according to claim 15, wherein the associated period is the time required to download the number of frames of the segment corresponding to the stream.

17. An apparatus according to claim 13, further comprising: means for constraining the second bandwidth in accordance with a time needed to play back all of the segments corresponding to the first number of streams at the client.

18. An apparatus according to claim 13, wherein the first number of streams corresponds to the maximum number of streams that the client can process.

19. An apparatus according to claim 13, further comprising: means for adjusting the respective number of frames comprising each segment so as to minimize a maximum server bandwidth and a maximum client bandwidth.

20. An apparatus according to claim 13, further comprising: means for encoding the media object.

21. An apparatus according to claim 20, wherein the encoding means is operable in accordance with Variable Bit Rate (VBR) encoding.

22. An apparatus for providing a media object to a client from a server coupled to the client via a connection, the media object being fragmented into segments in accordance with a fragmentation sequence from a first segment to a last segment, each segment comprising a respective number of frames of media content in a respective succession from a first frame to a last frame, the media content associated with each of the segments being provided on a corresponding stream in accordance wit the succession from the first frame to the last frame, the apparatus comprising:

means for downloading media content at the client from a first number of the streams on the connection, the first number of the streams including the corresponding stream to the first segment;

means for halting the downloading of media content from the corresponding stream to the first segment on the connection when the respective number of frames of the first segment have been received on the corresponding stream;

means for downloading media content at the client from a next stream corresponding to a next segment in the fragmentation sequence on the connection after an operation of the halting means; means for starting operation of the means for downloading from the next stream at a point in the respective succession between the first frame and the last frame; and means for constraining a total server bandwidth associated with the media object, wherein the number of segments in the fragmentation sequence is $K_m$, and wherein each of the corresponding streams has an associated bandwidth $b^i_m$, the constraining means being operable so that the total server bandwidth $B_m$ satisfies the equation $$B_m = \sum_{i=1}^{K_m} b^i_m.$$

23. An apparatus for providing a media object to a client from a server coupled to the client via a connection, the media object being fragmented into segments in accordance with a fragmentation sequence from a first segment to a last segment, each segment comprising a respective number of frames of media content in a respective succession from a first frame to a last frame, the media content associated with each of the segments being provided on a corresponding stream in accordance with the succession from the first frame to the last frame, the apparatus comprising:

means for downloading media content at the client from a first number of the streams on the connection, the first number of the streams including the corresponding stream to the first segment;

means for halting the downloading of media content from the corresponding stream to the first segment on the connection when the respective number of frames of the first segment have been received on the corresponding stream;

means for downloading media content at the client from a next stream corresponding to a next segment in the fragmentation sequence on the connection after an operation of the halting means for starting operation of the means for downloading from the next stream at a point in the respective succession between the first frame and the last frame; and means for constraining a total server bandwidth associated with the media object, wherein the number of segments in the fragmentation sequence is $K_m$, and wherein each of the corresponding streams has an associated bandwidth $b^i_m$, and wherein the first number of streams is $U_m$, the constraining means being operable so that the total client bandwidth $B_{c,m(Sm)}$ satisfies the equation $$B_{c,m}(S_m)^m = \max_{1 \le i \le K_m - U_m + 1} \sum_{j=i}^{i+U_m-1} b_m^j.$$

24. An apparatus according to claim 23, further comprising: means for adjusting the respective number of frames comprising each segment so as to minimize the total server bandwidth and the total client bandwidth.

* * * * *

UNITED STATES PATENT AND TRADEMARK OFFICE
CERTIFICATE OF CORRECTION

PATENT NO.         : 7,047,307 B2
APPLICATION NO. : 10/939023
DATED              : May 16, 2006
INVENTOR(S)        : Li

It is certified that error appears in the above-identified patent and that said Letters Patent is hereby corrected as shown below:

At column 10, line 45, the succession from the ~~fist~~ first

At column 11, line 2, ~~$S^{m1}$~~ $S_m^1$ in accordance with a desired service latency $Wm$~~,~~

At column 11, line 11, wherein $\underline{f_m^i}$ denotes ~~$f_m^i$~~ the number of bits At column 11, line 49, the method comprising $\underline{the}$ steps of:

At column 11, line 66, $\underline{the}$ constraining step being performed

At column 12, line 37 (same as Col. 14, line 64)

At column 12, line 43 should read --$B_{C1m}(S_m)^{\underline{m}}$--

At column 14, lines 56-57 operation of the halting means$\underline{;}$ the $\underline{means}$ for starting operation At column 14, line 64, ~~$b_m^i$~~ $\underline{b_m^j}$ At column 14, line 66 should read --$B_{C1m}(S_m)^{\underline{m}}$--

Signed and Sealed this

Twenty-sixth Day of December, 2006

JON W. DUDAS
*Director of the United States Patent and Trademark Office*